United States Patent [19]

Siekmeier

[11] 3,967,685
[45] July 6, 1976

[54] INDEPENDENT AND BIASED CULTIVATOR SUPPORT

[75] Inventor: David August Siekmeier, Ankeny, Iowa

[73] Assignee: Deere & Company, Moline, Ill.

[22] Filed: July 5, 1974

[21] Appl. No.: 485,933

[52] U.S. Cl. .................... 172/573; 172/265; 172/551; 172/624; 172/629; 172/691; 172/711; 172/763

[51] Int. Cl.² .................. A01B 35/28; A01B 21/04; A01B 15/16; A01B 5/04

[58] Field of Search .......... 172/462, 500, 497, 551, 172/572-574, 583, 619, 643, 657, 646, 710, 705-708, 711, 714, 744, 748, 742, 335, 265, 264, 261, 142, 570, 773, 336, 691

[56] References Cited
UNITED STATES PATENTS

| | | | |
|---|---|---|---|
| 106,039 | 8/1870 | Eshleman | 172/336 |
| 358,013 | 2/1887 | Brown et al. | 172/711 X |
| 403,587 | 5/1889 | Head | 172/336 |
| 631,598 | 8/1899 | Todd | 172/572 X |
| 631,844 | 8/1899 | Brennan, Jr. | 172/462 |
| 1,031,518 | 7/1912 | Brigden | 172/573 |
| 1,337,425 | 4/1920 | Babcock et al. | 172/572 X |
| 1,675,636 | 7/1928 | Brack | 172/142 |
| 2,756,662 | 7/1956 | Christensen | 172/462 X |
| 2,850,956 | 9/1958 | Rogers et al. | 172/763 X |
| 3,098,529 | 7/1963 | Wade et al. | 172/705 X |
| 3,405,767 | 10/1968 | Thompson | 172/572 |
| 3,608,646 | 9/1971 | Ryan | 172/551 X |
| 3,627,063 | 12/1971 | Ryan | 172/462 X |
| 3,734,201 | 5/1973 | Zaun | 172/551 |
| 3,782,481 | 1/1974 | Quanbeck | 172/265 |
| 3,800,881 | 4/1974 | Washburn | 172/710 X |

FOREIGN PATENTS OR APPLICATIONS

| | | | |
|---|---|---|---|
| 130,583 | 12/1948 | Australia | 172/708 |
| 21,108 | 7/1929 | Australia | 172/573 |
| 1,069,374 | 7/1954 | France | 172/705 |
| 1,350,137 | 12/1964 | France | 172/574 |
| 1,358,704 | 12/1964 | France | 172/643 |
| 245,585 | 11/1909 | Germany | 172/573 |
| 629,032 | 12/1961 | Italy | 172/264 |
| 80,576 | 6/1934 | Sweden | 172/711 |
| 10,852 | 6/1900 | United Kingdom | 172/462 |

Primary Examiner—Edgar S. Burr
Assistant Examiner—Steven A. Bratlie

[57] ABSTRACT

A rotary hoe implement, having hoe support arms independent of adjacent hoe support arms, and a selectively adjustable means for varying the downward pressure exerted by the leaf spring biasing means acting on each support arm.

2 Claims, 3 Drawing Figures

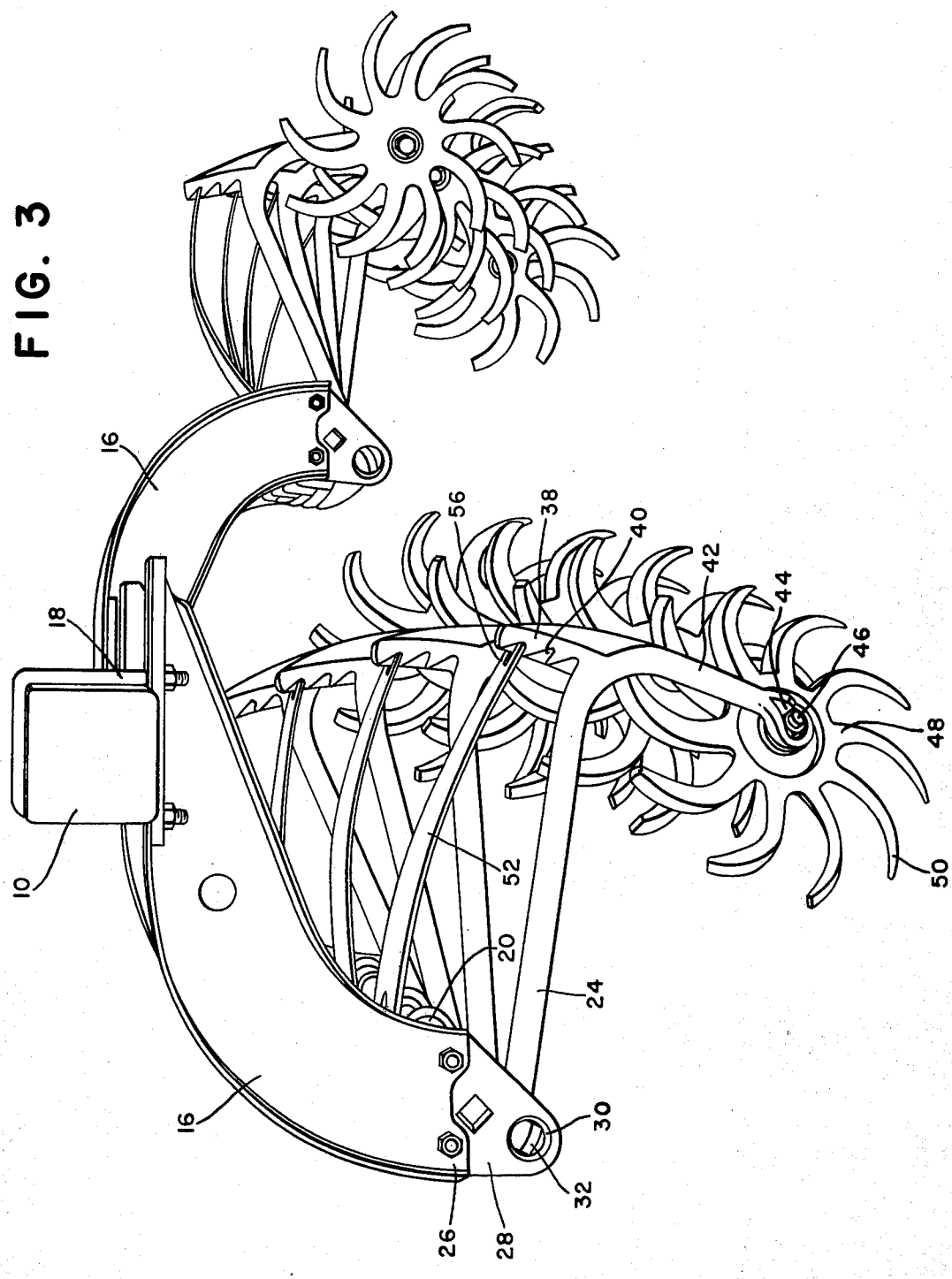

INDEPENDENT AND BIASED CULTIVATOR SUPPORT

BACKGROUND OF THE INVENTION

The present invention relates generally to farm implements and more particularly relates to rotary hoes, cultivators and the like used in working flat, bedded or listed crops. More particularly it relates to a rotary unit in which each rotary member of a gang is individually mounted for movement with respect to other rotary members in the gang.

Modern farming practices require that the tillage implements especially of the rotary cultivator type etc., be relatively able to service a large area to permit the power of the modern tractor to be economically utilized and at the same time be sufficiently flexible with respect to the increased width of the implement to enable the individual downwardly-biased wheel units to follow varying ground contour. Additionally it is necessary that rotary cultivators be able to efficiently work bedded crops as well as flat or listed crops. It is desirable therefore that each cultivator wheel be able to exert a downward force independent of that exerted on adjacent wheels.

SUMMARY OF THE INVENTION

The primary object of the invention is to provide a rotary cultivator or like gang in which each cultivator wheel has the specific characteristics cited above. A further object of the invention is to provide a rotary cultivator etc. which operates equally well in flat, listed or bedded crop conditions. An additional object of the invention is to provide a rotary cultivator, etc. unit in which each cultivator wheel possesses the ability to move vertically independently of the adjacent cultivator wheels so that each wheel may exert a downward force uninfluenced by the forces encountered in the adjacent cultivator wheels.

Yet another object of the invention is to provide a rotary cultivator which has a simple and individually adjustable leaf spring suspension means for each rotary cultivator wheel wherein each leaf spring suspension means is so arranged that its force diminishes as the cultivator wheel raises.

BRIEF DESCRIPTION OF THE DRAWINGS

FIG. 3 is a side perspective view of the implement.

DESCRIPTION OF A PREFERRED EMBODIMENT

Figure 1:
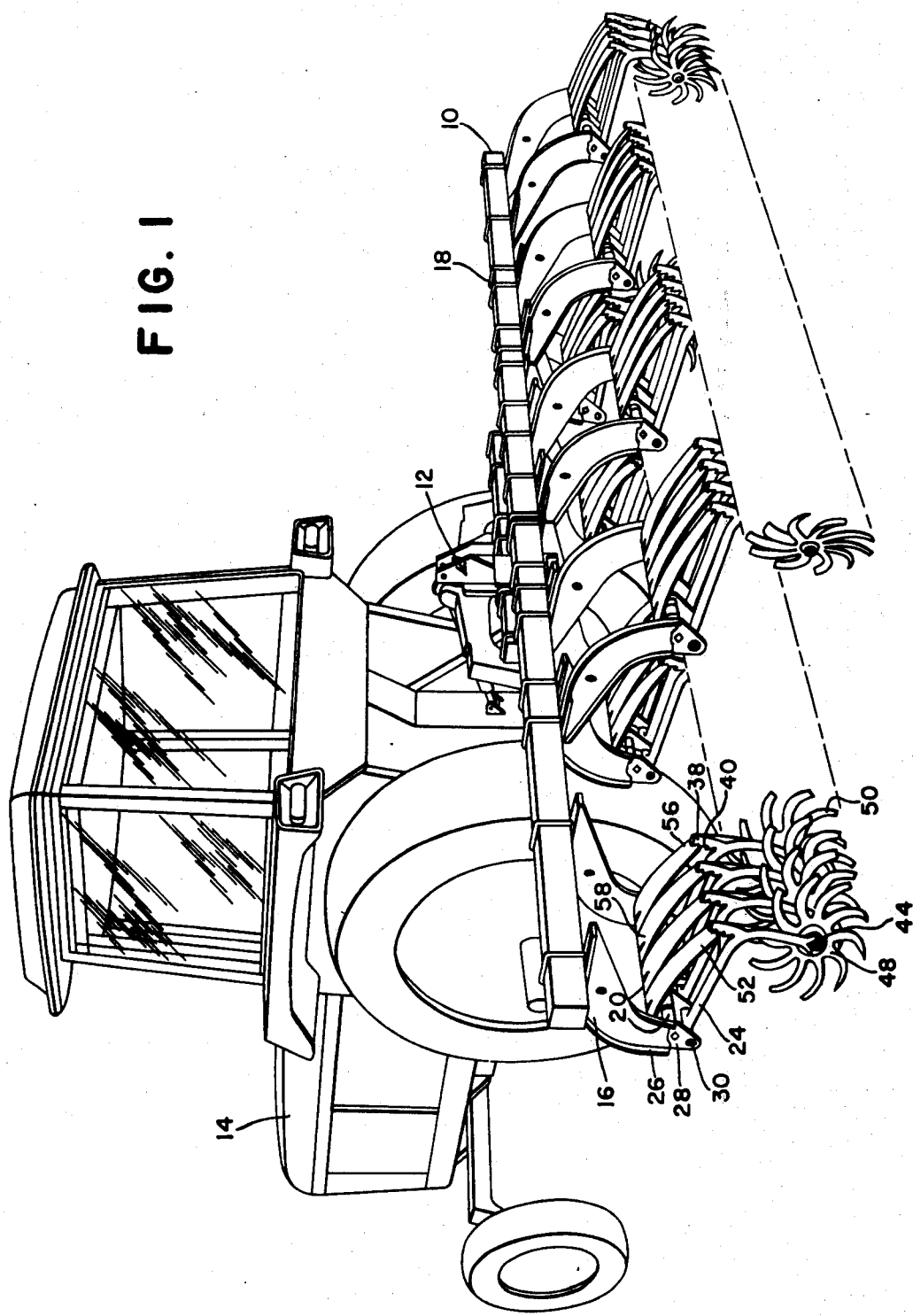
FIG. 1 is a perspective view of the implement as seen from the rear and side.
Figure 2:
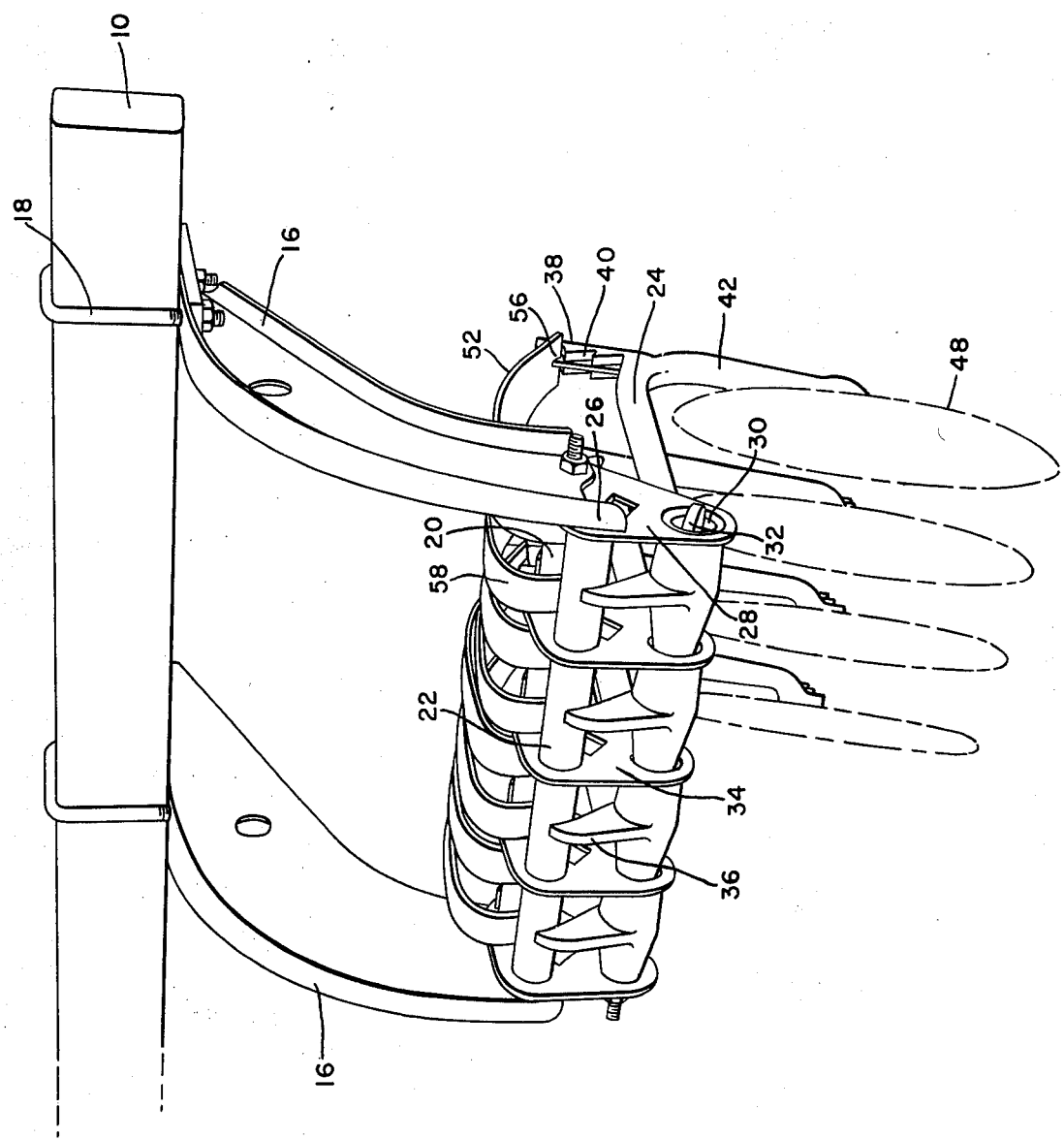
FIG. 2 is a rear perspective view of the implement.

In the preferred embodiment illustrated the implement is by way of example of rotary cultivator and includes a transversely extending main frame or toolbar 10 carried by a typical three-point hitch 12 of a tractor 14.

Several transversely spaced-apart sets of front and rear supporting arm structures or support frames 16 are rigidly attached, as by U-bolts 18, to the toolbar. The rear frames extend rearwardly and downwardly and the front frames extend forewardly and downwardly from the toolbar. Mounted between each set of support frames 16 are a leaf spring pivot shaft 20 and a support arm stop bar 22 that limits downward motion of a support arm 24 and which also serves to stabilize the support frame 16 against lateral movement. Attached to the lower end 26 of the support frame 16 and extending downwardly are supports in the form of mounting plates 28 with openings 30 for carrying a support arm pivot shaft 32 parallel to the leaf spring pivot shaft 20.

Pivotally mounted on the support arm pivot shaft 32 between the vertical spacers 34 employed to maintain the spaced-apart relationship are the front terminal portions of the arms 24. On the forward end of each support arm 24 is an upwardly extending ear 36 which serves as a stop means when abutting against the forward side of the stop bar 22, thereby limiting the downward pivotal movement of the arm. Each support arm 24 extends rearwardly and downwardly from the support arm pivot shaft 32 and terminates in a T-shaped rear portion having an upper segment 38 provided with notches 40 and a lowermost segment 42 having an opening 44 receiving a shaft 46 on which a rotary member such as a cultivator wheel 48 is mounted. Each wheel 48 is of typical construction, each having a plurality of generally radially extending tines 50 with outer tips extending slightly rearwardly with respect to the direction of movement.

Downward force is applied on each wheel 48 by means including fore-and-aft extending arcuate leaf springs 52. The forward end 58 of each leaf spring is carried by the toolbar by means of being wrapped about the leaf spring pivot shaft 20. Each spring 52 extends rearwardly and has a rearwardmost slotted end 56 nested or received by the notched portion 40 of the support arm 24. The notches 40 and ends 56 serve as means connecting the springs 52 to the support arms 24.

When the wheels 48 are in a working position, the arrangement of the support arms 24 and leaf springs 52 provides a substantially constant downward force on each wheel. As each wheel 48 raises when it passes over obstructions, uneven ground or bedded crops the downward force exerted by the associated leaf spring diminishes. This can best be understood by referring to FIG. 3 wherein it can be seen that if the support arm pivots upwardly with respect to the toolbar 10, the lever arm through which the leaf spring 52 acts thereby decreases.

The lever arm decrease results from the rearward position of the leaf spring pivot shaft 20 relative to the support arm pivot shaft 30. As the lever arm decreases, and therefore the resulting force exerted by the rearward portion of the leaf spring 52 increases, the downward acting component of that rearward-acting force tending to cause the arm to move downwardly toward the ground decreases as the support arm 24 raises. The rate at which the downward acting force component decreases can be changed by varying the vertical nesting position of the rearward position of the leaf spring 52 on the support arm 24. Through individual wheel suspension control, each cultivator wheel can be adjusted to accommodate varying crop or ground conditions. When the cultivator is used to work bedded crops, the leaf springs 52 are positioned such that the downward pressure on the wheels decreases as the positions of the wheels 48 relative to the ground increases. Therefore the resulting disturbance of the ground wherein the bedded crop lies is minimized and the plant not damaged. When flat, listed or hard ground is worked, the leaf spring 52 can be positioned so that the downward acting component of force is at the maximum to insure proper ground penetration and cultivation.

Since the weight of the toolbar 10 is transferred to the wheels 48, no additional weight is required to provide a downward force on the wheels and the implement can be of relatively lightweight construction. With a large portion of the weight of the implement and toolbar 10 connected directly to the tractor three-point hitch 12, the center of gravity is very close to the rear of the tractor 14. This keeps the weight on the rear of the tractor at a minimum so that toolbar and implement can be safely lifted with a tractor three-point hitch.

I claim:

1. A rotary cultivator implement comprising: a main frame including a toolbar extending transversely across an expanse of a plurality of row crops; a plurality of transversely spaced fore-and-aft extending subframe members mounted in pairs on the toolbar, some pairs of which extend from rear portions fixed to the toolbar to forward end portions spaced in front of the toolbar, and some pairs of which extend rearwardly from front portions fixed to the toolbar to rear end portions spaced to the rear of the toolbar; transversely extending upper and lower vertically spaced-apart and horizontal pivot support members mounted between the aforesaid subframe end portions of the respective pairs of subframe members; a plurality of T-shaped cultivator-carrying arms each having a horizontal stem portion extending rearwardly from and supported on the lower pivot support member for vertical swinging movement thereabout and a rear vertical portion projecting above and below the horizontal portion at its rear end; a plurality of leaf springs supported on the upper pivot support member for vertical swinging movement thereabout, each spring vertically offset above a horizontal arm portion and extending rearwardly from and supported to swing vertically on the upper of the pivot support members; means connecting each spring with the vertical portion above the horizontal portion whereby each spring will yieldably resist upward vertical movement of its respective arm; and rotary cultivator members supported on rear portions of the arms below their respective horizontal portions.

2. The invention defined in claim 1 characterized in that the subframe members carry a plurality of rotary cultivator carrying arms with said subframe members being supported along the toolbar to provide spacing between selected subframe members for rows of crops to pass as the implement moves forwardly and those cultivators carried on the arms extending forwardly are substantially in tandem with those cultivators carried on the arms extending rearwardly from the toolbar.

* * * * *